(12) United States Patent
Panuccio

(10) Patent No.: US 7,722,244 B2
(45) Date of Patent: May 25, 2010

(54) PROCESS FOR OPERATING A WATER RECOVERY PLANT

(75) Inventor: Mario Panuccio, Benowa (AU)

(73) Assignee: Waste Saver Pty Ltd, Arvndel (AU)

( * ) Notice: Subject to any disclaimer, the term of this patent is extended or adjusted under 35 U.S.C. 154(b) by 1037 days.

(21) Appl. No.: 10/537,964

(22) PCT Filed: Dec. 10, 2003

(86) PCT No.: PCT/AU03/01651

§ 371 (c)(1),
(2), (4) Date: Dec. 9, 2005

(87) PCT Pub. No.: WO2004/052791

PCT Pub. Date: Jun. 24, 2004

(65) Prior Publication Data

US 2006/0126426 A1 Jun. 15, 2006

(30) Foreign Application Priority Data

Dec. 10, 2002 (AU) ............................. 2002953236

(51) Int. Cl.
B28C 7/04 (2006.01)
(52) U.S. Cl. ........................ 366/8; 366/17; 210/740; 210/747
(58) Field of Classification Search ............. 366/152.1, 366/152.4, 17, 8; 210/739, 740, 747
See application file for complete search history.

(56) References Cited

U.S. PATENT DOCUMENTS

| 4,226,542 A * | 10/1980 | Black et al. ................. 366/17 |
| 4,488,815 A * | 12/1984 | Black ......................... 366/8 |
| 4,512,811 A | 4/1985 | Binnig et al. |
| 5,178,455 A | 1/1993 | Ohsaki et al. |
| 5,268,111 A * | 12/1993 | Metz et al. .................. 210/712 |
| 6,758,590 B1 * | 7/2004 | Black .......................... 366/64 |
| 2002/0084226 A1 | 7/2002 | Jordan et al. |
| 2003/0006194 A1 * | 1/2003 | Williams et al. ............ 210/702 |
| 2004/0094462 A1 * | 5/2004 | Preisser et al. .............. 210/172 |

FOREIGN PATENT DOCUMENTS

| CH | 662 774 | 10/1987 |
| DE | 30 27 503 | 2/1982 |
| DE | 33 04 193 | 8/1984 |

(Continued)

OTHER PUBLICATIONS

Derwent Abstract Accession No. 82851D/45, Class E36, J03, SU 343568 A (Leontovich), Jul. 10, 1981, 1 page.

*Primary Examiner*—David L Sorkin
(74) *Attorney, Agent, or Firm*—Patterson Thuente Christensen Pedersen PA

(57) ABSTRACT

A process for operating a water recovery plant comprising charging a storage tank with water contaminated with solids water recovered from a manufacturing or construction process, determining a parameter associated with the concentration of one or more selected contaminants in the storage tank, diluting the water contaminated with solids whereby the concentration of the one or more selected contaminants in the storage tank is at or below a desired level, and utilizing water from the storage tank in the manufacturing process.

14 Claims, 4 Drawing Sheets

FOREIGN PATENT DOCUMENTS

| | | |
|---|---|---|
| DE | 42 31 238 | 3/1994 |
| DE | 42 44 616 | 7/1994 |
| DE | 197 38 471 | 3/1999 |
| EP | 0 062 339 | 10/1987 |
| JP | 10-180238 | 7/1998 |
| JP | 2003-334568 | 11/2003 |

* cited by examiner

PROCESS FOR OPERATING A WATER RECOVERY PLANT

FIELD OF THE INVENTION

The present invention relates to a process for operating a water recovery plant. In particular, the present invention relates to a process for operating a water recovery plant associated with a manufacturing or construction facility from which water contaminated with solids is processed and recycled into the manufacturing or construction facility.

BACKGROUND

Many manufacturing and construction processes result in the production of waste water. Environmental considerations require that waste water containing high levels of solids produced as a by-product from manufacturing or construction processes be treated to reduce the level of solids and other contaminants to an acceptable level prior to the disposal or reuse of the waste water. Statutory authorities regulate the level of contaminants that may be present in waste water disposed of through storm water, grey water or sewerage systems. Prior to such disposal of waste water it is often necessary to remove one or more contaminants whereby the waste water is of a quality suitable for disposal. In any process where contaminants are removed from waste water the contaminants need also to be disposed of. The disposal of such contaminants may be costly or technically difficult.

In many manufacturing processes waste water is produced as a by-product and has relatively high levels of suspended solids. The suspended solids may be removed by filtration or other processes to an acceptable level. However, the filter cake or waste that is produced by these processes requires disposal. Waste water containing other contaminants may require treatment by other processes to remove contaminants. However, the contaminants removed from the waste water require separate disposal. The disposal of contaminants removed from waste water is often regulated and there disposal imposes a cost or technical burden on the operator.

In the manufacture of ready mix concrete large volumes of water are consumed in production as well as in the cleaning of the production facility and wet concrete transport vehicles. The cleaning of the facility and vehicles is critical to the production process so that wet concrete is removed before it sets and becomes far more difficult to remove.

Concrete transport vehicles typically return about 3 to 5% of the wet concrete to the production facility, the majority of which is dumped in landfill and the remainder rinsed from vehicles which produces contaminated water as well as a small amount of aggregate that cannot be economically reused. It is not feasible to recover all, or more, of the aggregate as this will generate far greater volumes of contaminated water that needs to be filtered prior to disposal.

It has not generally been possible to economically recycle this contaminated water back into the manufacturing process as it is heavily contaminated with fines that when incorporated into a concrete blend increases the quantity of cement required to obtain the desired strength in the concrete. Furthermore, the presence of high quantities of fines leads to slumping of the concrete as the fines retain excessive water and also results in cracking of the concrete. Accordingly, in the manufacture of ready mix concrete only a very small quantity of water has been, or in fact can be, returned to the manufacture of concrete.

Other construction processes face similar challenges when dealing with waste water contaminated with excessive quantities of solids. For example in the production of foundations the water used to carry illminite is generally town water as the waste water produced is often too high in contaminants. In tunnelling processes water is often used as a cutting fluid and contaminated water is not generally recycled unless it has been passed through a filter press or other process for the removal of substantially all of the contaminants. It will be appreciated that by removing substantially all of the contaminants a large quantity of waste is produced.

We have now found a process for operating a water recovery plant associated with a manufacturing or construction process whereby the quantity of waste produced for disposal may be reduced.

STATEMENT OF INVENTION

According to the present invention there is provided a process for operating a water recovery plant comprising charging a storage tank with water contaminated with solids, said water recovered from a manufacturing or construction process, determining a parameter associated with the concentration of one or more selected contaminants in the storage tank, diluting the water contaminated with solids whereby the concentration of the one or more selected contaminants in the storage tank is at or below a desired level, and utilising water from the storage tank in the manufacturing process.

The present invention recognises that many manufacturing and construction processes can accept water having a certain level of solid contaminants. Typically in such manufacturing and construction processes the quantity of waste water produced is less than that which is required in the operation of the manufacturing process. Thus additional water must be sourced for use in the manufacturing process. This additional water typically will be obtained from a town water supply and be substantially uncontaminated. We have found that by using this substantially uncontaminated water to dilute the waste water from the manufacturing process it is possible to recycle a greater proportion of the by-products of the manufacturing process and thereby minimise the amount of waste produced in the treatment of the waste water.

The present invention will be described in detail with respect to the manufacture of ready mixed concrete, but it will be appreciated that the process of the present invention will be applicable to a variety of other manufacturing and construction processes.

In the manufacture of ready mix concrete water is used in the production of concrete. The water is combined with the other components including the cement and particulates such as aggregate and sand. A significant quantity of water is also used in washing the equipment used in the manufacturing processes. It is necessary for the equipment to be washed before the concrete sets and in the washing process a significant quantity of suspended solids contaminates the water. Water is also used in washing out the rotating bowls mounted on vehicles used to distribute the ready mixed concrete. The washings from the bowls include water contaminated with suspended solids as well as grades of aggregate and stone fines. The washings may, in the context of the present invention, be put through a recovery process where grades of aggregate are separated from the washings according to size distributions. These recovered grades of aggregates may be used to replace aggregate that would otherwise be purchased or quarried by the concrete manufacturer.

The water that has been separated from the recovered aggregate and stone fines may be initially collected in a pit from which the used water may be pumped into a storage tank. The use of a pit for providing an initial storage of the waste water advantageously allows the variations in the usage and collection of water used for washing to be buffered and a continuous flow of waste water pumped from the pit into the storage tank.

In the context of the present invention contaminants that are hostile to the manufacture of concrete include inert fines, cementitious product, clay and combinations thereof.

The parameter determined may include suspended solids and specific gravity.

The water recovered from washing the concrete manufacturing equipment and the bowls of the distribution vehicles is typically contaminated with suspended solids. The concentration of suspended solids in the storage tank may be determined by any convenient means. It is preferred that the concentration of suspended solids be continuously monitored such that as the concentration of suspended solids exceed a desired level the recycled water in the storage tank may be diluted such that the level of suspended solids is reduced to or below the desired level. We have found that in the treatment of recycled water for subsequent use in the manufacture of ready mixed concrete it is preferable that the level of suspended solids be maintained at or below 100,000 ppm, more preferably below 50,000 ppm. Conveniently we have found that the use of a suspended solids meter enables the level of suspended solids to be readily determined. Specific gravity is a parameter that may also be used to determine the level of suspended solids. A specific gravity of 1.05 adequately approximates water having 100,000 ppm of suspended solids and a specific gravity of 1.025 adequately approximates water having 50,000 ppm of suspended solids that may contaminate the water from washing concrete manufacturing equipment.

Recycled water from the storage tank may be used to provide the water for use in the manufacture of ready mix concrete. Water may be extracted from the storage tank and used as batch water in the manufacture of concrete and/or be taken from the storage tank to be used for washing of the concrete manufacturing equipment and the rotating bowls of distribution vehicles.

Water taken for use in the manufacturing of additional batches of concrete may be further diluted, such as in a header tank prior to its use in the manufacture of additional batches of concrete.

The water used to dilute the recycled water may be water derived from a town water supply of potable water or other source of relatively clean water. In one embodiment of the present invention, where the selected storage capacity of the system is reached the water used to dilute the recycled water may be excess recycled water that has been subjected to a purification process such as by a filter press. In another embodiment of the present invention, a portion of a heavily contaminated batch of recycled water may be filtered to remove excess suspended solids from that portion and the filtered recycled water may be subsequently used to dilute the remaining recycled water in a storage tank.

In a continuous manufacturing process it is preferred that a plurality of storage tanks be used in sequence. Thus, water pumped from a storage pit may be used to initially charge a first storage tank and the recycled water within the first storage tank is diluted as necessary to maintain a contamination level below the desired level of suspended solids and once that storage tank is full, or being used as a source of water for the manufacture of further batches of concrete or for the washing of the manufacturing equipment or the rotating bowls of distribution vehicles the recycled water pumped from the pit may be pumped into a second storage tank and the recycled water in the second storage tank may be diluted to maintain a level of suspended solids at or below the desired level. Similarly third and subsequent storage tanks may also be used. The number and size of the storage tanks will be determined by the quantity of recycled water required for use in the manufacturing process.

In use, a water treatment plant comprising a plurality of storage tanks may be used according to the following process. Recycled water collected from the manufacture of ready mix concrete or cleaning of equipment and vehicles may be collected in a pit such that recycled water may be removed from the pit on a continuous basis, thereby buffering the water treatment process from any variation in the flowing rate of water to be recycled. Water pumped from the pit may be charged into a first storage tank and the level of suspended solids in the first storage tank measured using a suspended solids meter to determine the level of suspended solids. Where the concentration of suspended solids in the first storage tank exceeds a specified value the recycled water is diluted such that the concentration of suspended solids is at or below a specified level. Once the first storage tank is full, the water pumped from the pit is charged into a second storage tank. The concentration of suspended solids in the second storage tank is also measured and the recycled water is diluted to maintain the concentration of suspended solids below a desired level. Third and subsequent storage tanks may be employed in the same manner. In the event that the concentration of suspended solids in a storage tank exceeds the specified value and the storage tank is full so that further dilution is not possible, some of the recycled water in the storage tank may be pumped to the surge tank for purification.

It would be apparent that the process of the present invention may be applied to the operation of water recovery plants in manufacturing and construction processes that produce water contaminated with suspended solids other than in the manufacture of ready mix concrete. Other manufacturing processes may advantageously employ the method of the present invention.

BRIEF DESCRIPTION OF THE DRAWINGS

The present invention will now be described with reference to the accompanying drawings. The accompanying drawings serve to illustrate, but not limit, the present invention.

DETAILED DESCRIPTION OF THE INVENTION

Figure 1:
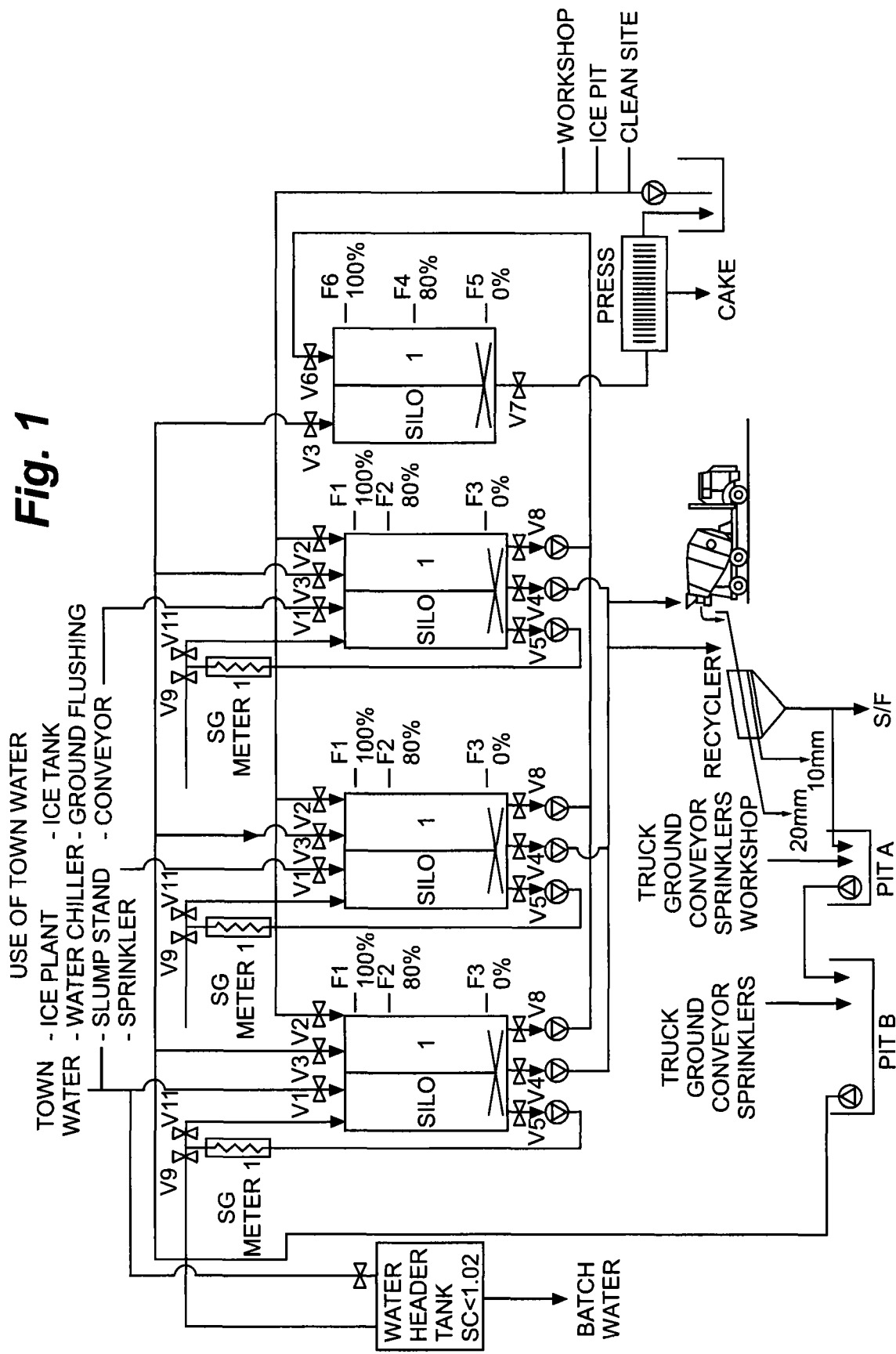
FIG. 1 is a process flow diagram showing the flow of recycled water within a water treatment plant operating in accordance with one embodiment of the present invention.

Water used for washing concrete mixing equipment including rotating bowls and vehicles used for distribution is passed through a recycler shown in FIG. 1. The reclaimer separates particulates into various grades dependant upon size. It can be seen from the process flow diagram that particulates of 20 mm or greater are separated into one stream, particulates of from 10 mm to 20 mm are separated into a second stream and sediment or fines are removed from a third stream. The resultant water for recycling may include suspended solids. The water is collected into a first pit, pit A, from which it is pumped into a second pit, pit B, by a non return pump. Recycled water containing suspended solids may be pumped from pit B using a non return pump into a first silo through valve V3. Valve V5 is open and water from silo 1 may be pumped through a specific gravity meter and returned through valve 11 to the silo. Alternatively or in addition, the water may be pumped through valve 9 into a water header tank. The water header tank contains water for use in the manufacture of batches of ready mixed concrete. Additional water may be added to the water weigh hopper directly from the town water supply through valve 10.

In the event that the specific gravity measured on the specific gravity meter 1 exceeds a predetermined value the recycled water in silo 1 may be diluted using either town water through valve V1 or using filtered water through valve V2. Water may be removed from silo 1 through valve V4 for use in washing the concrete manufacturing equipment or the rotating bowls of distribution vehicles. Such water is then available for collection through the recycler as discussed above. In the event that the recycled water in silo 1 is contaminated at a level substantially in excess of the preset value the recycled water from silo 1 may be pumped through valve V8 with a non return pump into silo 4 through valve V6. Silo 4 may also be filled directly from pit B through valve 3. Water may be filtered from silo 4 through valve 7 in a press. Filter cake may be removed from the press for disposal. The filtered water may be pumped using a non-return pump into the first or subsequent storage silos through valve V2.

Once any of the first silos are filled, the process for operating the water treatment plant may direct the water through subsequent storage silos.

Figure 2:
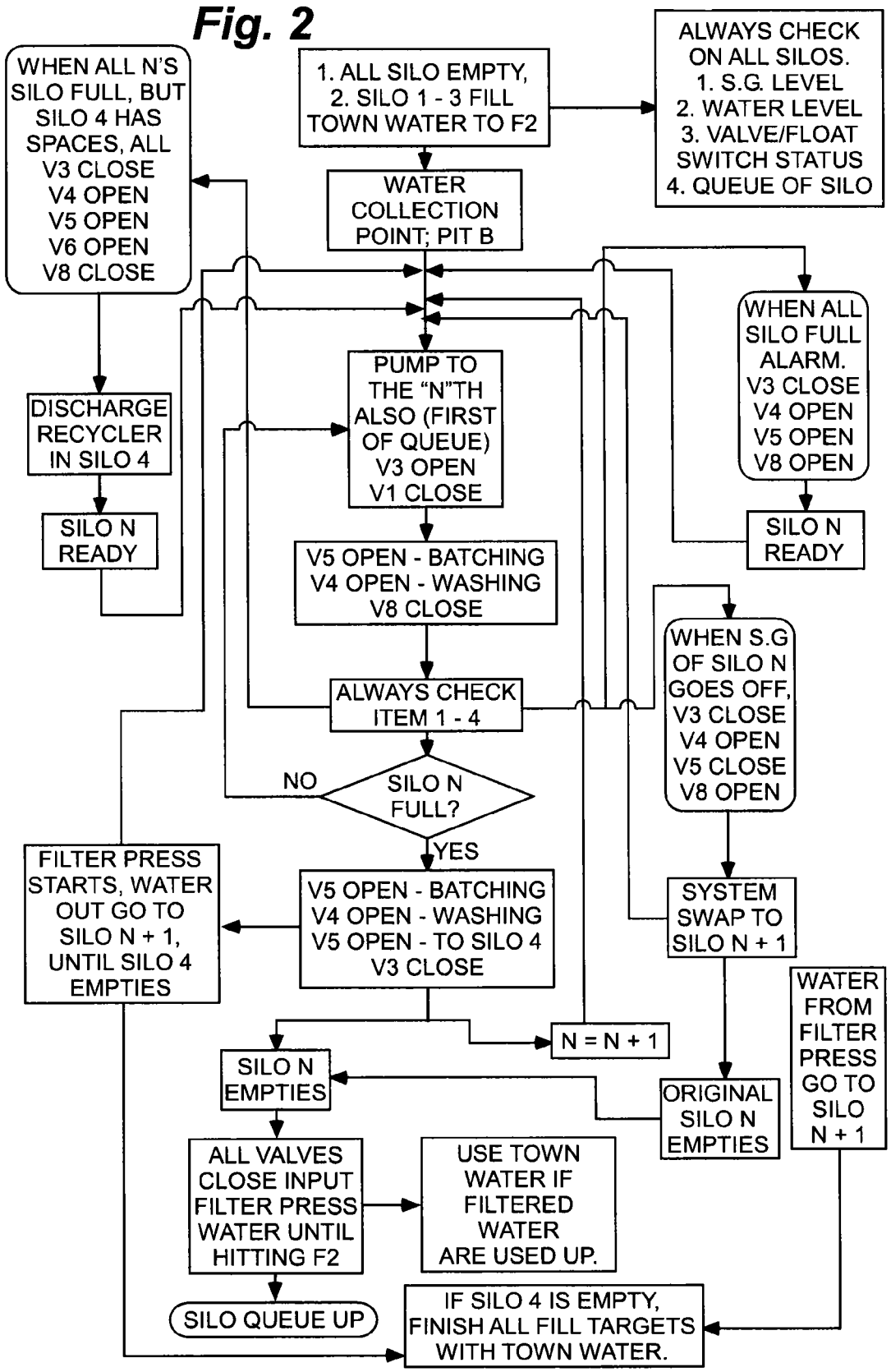
FIG. 2 is a flow chart for the operation of the water treatment plant shown in FIG. 1.

An example of the process control used in the operation of the water treatment plant is shown in FIG. 2.

Figure 3:
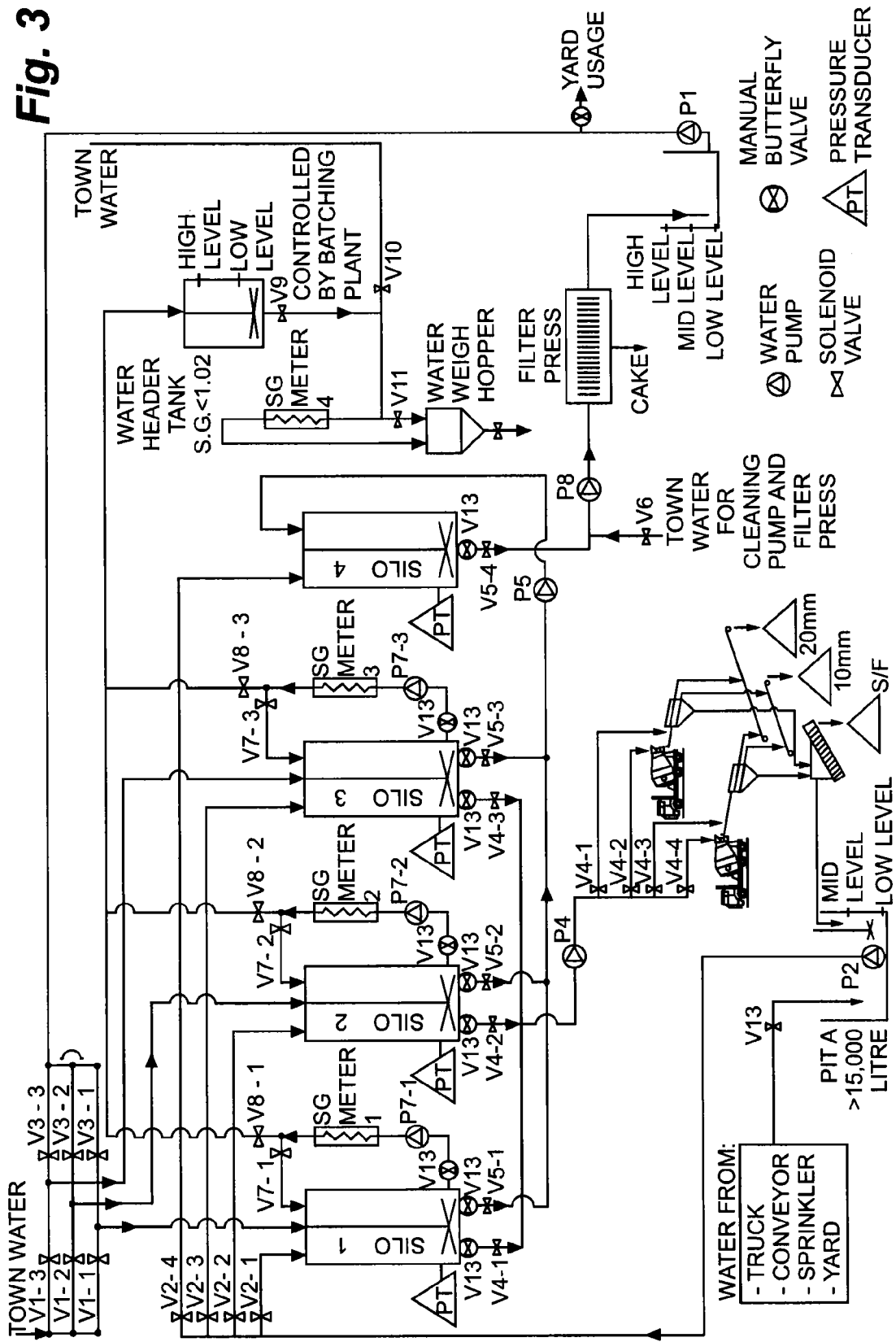
FIG. 3 is a process flow diagram showing the flow of recycled water within a water treatment plant operating in accordance with a second embodiment of the present invention.
Figure 4:
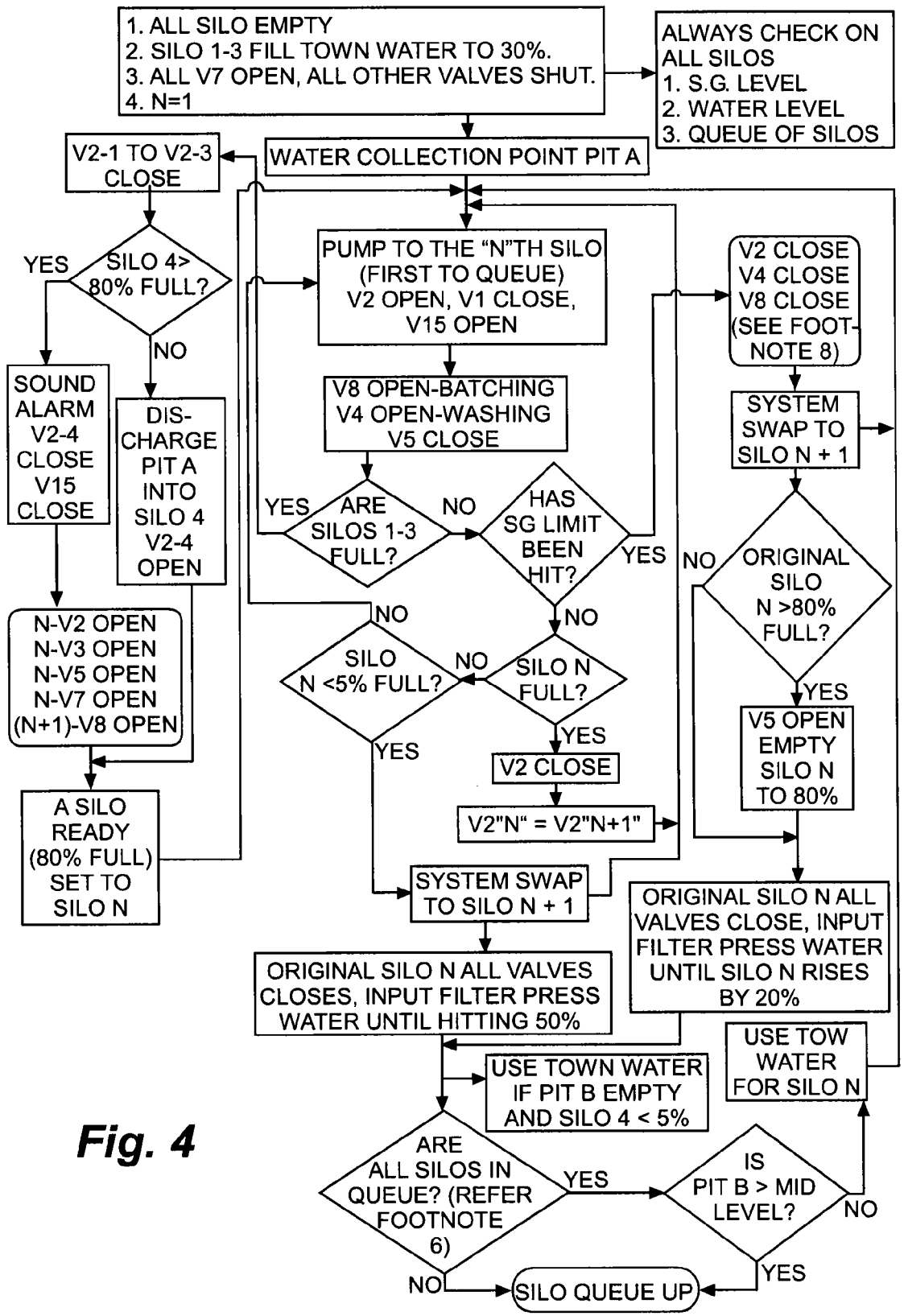
FIG. 4 is a flow chart for the operation of the water treatment plant shown in FIG. 2.

FIGS. 3 and 5 show a second embodiment of the process of the present invention. FIG. 3 shows a batch plant water recycle system for a concrete manufacturing plant. FIG. 4 shows a flow chart for the operation of the batch plant recycle system shown in FIG. 3. On initiation of the batch plant water recycle system shown in FIG. 3 all silos (1, 2, 3 and 4) are empty. Through solenoid valves V1-1, V1-2 and V1-3 town water is used to fill silos 1, 2 and 3 to 30% of capacity. The water levels are measured by a pressure transducer (PT). The suspended solids level in each of silos 1, 2 and 3 are measured by SG meters 1, 2, 3 respectively. The contents of silos 1, 2, 3 are respectively recircled through the specific gravity metres 1, 2, 3 by water pumps P7-1, P7-2, P7-3 respectively and returned to the respective silos 1, 2, 3 by solenoid valves V7-1, V7-2 and V7-3 respectively. The suspended solids in each of the silos are measured continuously throughout the operation of the batch plant water recycle system.

The silos are put in a queue for both accepting recirculated water as well as providing water for use in the concrete manufacturing process. As water is collected in pit A the water is pumped by water pump P2 to the silo at the head of the queue, in the first instance silo 1. Valve V2-1 is open allowing water from pit A to be pumped into silo 1. Valve V1-1 is closed preventing town water from being pumped into silo 1. Valve V15 permits water from a variety of other sources to be collected in pit A. Whilst the suspended solids meter SG1 is below the preset limit, valve V8-1 may be opened for providing water for batching the manufacture of cement. Solenoid valve V4-1 is open for use in providing water for the reclaiming of concrete from returned trucks as well as rinsing out of the trucks. Valve 5-1 for providing water to silo 4 is closed.

Whilst the process operates and the specific gravity measured on SG meter 1 is below a preset limit and silo 1 is neither empty or full the water required for the batching of concrete and washing of trucks is obtained from silo 1 and the water collected in pit A is pumped into silo 1.

Once silo 1 reaches a suspended solids measured on SG meter 1 of a preset limit or higher valve V2-1 is closed as is valve V4-1 and V8-1. Valve V2-2 is open as is V8-2 and V4-2 so that water from silo 2 is available for both batching and washing. If silo 1 is greater than 80% full and the specific gravity meter 1 indicates a suspended solids level above a preset value then valve V5-1 is opened and the contents of silo 1 is pumped by pump V5 into silo 4. If the contents of silo 1 is less than 80% full then if available, water from tank B is pumped by pump P1 through valve V3-1 into silo 1 until the water level in silo 1 raises by 20%. If pit B is empty and silo 4 is less than 5% full then valve V1-1 is opened and silo 1 is charged with town water until it raises by 20%.

Where a silo reaches a filled condition, valve V2 closes and the water being pumped from pit A is used to charge the next silo in the queue.

In the event that all of the silos 1, 2 and 3 are full then the valves V2-1, V2-2 and V2-3 are closed and if silo 4 is less than 80% full then pit A is discharged into silo 4 via valve V2-4. If silo 4 is greater than 80% full an alarm is sounded and valve V2-4 is closed as is valve V15.

For any silo, valve 7 must be closed when valve 8 is open and vice versa. Valve 8 is only to open when there is capacity in the header tank.

Silos to be filled in the order they arrive at queue.

Should any silo reach less than 2% full, the stirrer is to be turned off. It is to run at all other times.

Each silo's recirculating pump is to run when 40% or more full unless it is pumping to the header tank.

Filter press always empties silo 4 when there is capacity in pit B.

If silo 4 reaches 100% full at any time, all valves V5 and V2-4 are to close until silo 4 reaches 95% full and are then to reopen.

Water header tank always to be filled whilst below high level. If at low level, batch with town water.

If all silos are over SG limit, use town water to batch until a silo is under SG limit. Then set this silo to N and restart.

For all valve numbers, only one can be open at any one time.

Pump P2 is only to run when mid level switch in pit A is covered.

Valves V13 are manual shutoff valves.

Advantageously, the present invention allows concrete manufacturers to reclaim significant quantities of aggregate whilst also reducing the amount of contaminated water of which to dispose. Surprisingly these seemingly contradicting requirements are met in this process without any adverse effect on the properties of the concrete that requires the addition of extra cement or other costly additives.

The claims defining the invention are as follows:

1. A process for operating a water recovery plant comprising sequentially charging a plurality of storage tanks with water contaminated with solids, said water recovered from a manufacturing or construction process, said plurality of storage tanks each utilizing a sensor for determining the specific gravity of the water contaminated with solids in storage tank so that when the specific gravity reaches a predetermined level the storage tank is bypassed and a next storage tank in the sequence is filled, adding water to each of the plurality of storage tanks to dilute the water contaminated with solids to form a diluted water whereby the concentration of one or more selected contaminants in each of the plurality of storage tanks is at or below a desired level, and utilizing the diluted water from each of the plurality of storage tanks in the manufacturing of ready mix concrete.

2. A process according to claim 1 wherein the contaminated water recovered includes washings from equipment used in the manufacture and transport of ready mix concrete.

3. A process according to claim 1 wherein the contaminated water is collected in a pit.

4. A process according to claim 1 wherein contaminated water is fed from the storage tanks sequentially for use in the manufacture of ready mix concrete or washing manufacturing or transport equipment.

5. A process according to claim 1 wherein a by-passed tank is filled with uncontaminated water.

6. A process according to claim 5 wherein the uncontaminated water is sourced from a town water supply.

7. A process according to claim 5 wherein the uncontaminated water is sourced from a filter press used to remove excess solids from recycled water from the process of the present invention.

8. A process according to claim 1 wherein the contaminated water is contaminated with contaminants selected from the group consisting of inert fines, cementitious product, clay and combinations thereof.

9. A process according to claim 1 wherein the concentration of suspended solids in the contaminated water is determined in addition to the specific gravity.

10. A process according to claim 1 wherein the specific gravity of the diluted water is maintained at or below 1.05.

11. A process according to claim 1 wherein the specific gravity of the diluted water is maintained at or below 1.025.

12. A process for operating a water recovery plant comprising sequentially charging a plurality of storage tanks with water contaminated with solids, said water recovered from a ready mix concrete manufacturing process, determining the specific gravity of the water contaminated with solids in each of the plurality of storage tanks, diluting the water contaminated with solids by adding water to each of the plurality of storage tanks to form a diluted water whereby the concentration of one or more selected contaminants in each of the plurality of storage tanks is at or below a desired level, and utilizing the diluted water from each of the plurality of the storage tanks in the ready mix concrete manufacturing process, and wherein the plurality of storage tanks incorporate a sensor for determining the specific gravity of the water contaminated with solids wherein upon the specific gravity reaching a predetermined level a storage tank is bypassed and a next storage tank in the sequence is filled.

13. A process according to claim 12 wherein the specific gravity of the diluted water is maintained at or below 1.05.

14. A process according to claim 12 wherein the specific gravity of the diluted water is maintained at or below 1.025.

* * * * *